United States Patent [19]

Foshee et al.

[11] Patent Number: 5,033,695
[45] Date of Patent: Jul. 23, 1991

[54] AILERON COUNTERBALANCE MOUNT BRACKET

[76] Inventors: Paul L. Foshee, P.O. Box 2273, Natchitoches, La. 71457; Holley L. Foshee, Rte. 1, Cloutierville, La. 71416

[21] Appl. No.: 469,032

[22] Filed: Jan. 23, 1990

[51] Int. Cl.$^5$ .............................................. B64C 19/00
[52] U.S. Cl. .................................. 244/82; 244/75 R; 244/213
[58] Field of Search ................ 244/75 R, 90 R, 90 B, 244/82, 215, 213

[56] References Cited

U.S. PATENT DOCUMENTS

| | | | |
|---|---|---|---|
| 1,336,161 | 4/1920 | Roe et al. | 244/82 |
| 1,779,398 | 10/1930 | Liebert | 244/82 |
| 2,370,893 | 3/1945 | Utsch | 244/90 R |
| 3,140,066 | 7/1964 | Sutter et al. | 244/215 |
| 4,230,295 | 10/1980 | Eppler | 244/215 |

FOREIGN PATENT DOCUMENTS 375900 10/1939 Italy ......................................... 244/82

*Primary Examiner*—Galen Barefoot
*Attorney, Agent, or Firm*—John M. Harrison

[57] ABSTRACT

A counterbalance mount bracket for mounting aileron counterbalances on the ailerons of selected aircraft, which counterbalance mount bracket includes an aileron attachment plate having a wing hinge flange adapted to mount on the wing hinge of the aircraft, an aileron hinge flange adapted to mount on the aircraft aileron hinge and a gusset plate for attaching the aileron counterbalance to the counterbalance mount bracket and facilitating pivoting of the aileron counterbalance with the aileron. In a preferred embodiment the counterbalance tubing attached to the counterbalance spade in the aileron counterbalance is welded to the gusset plate, which gusset plate is, in turn, welded to the wing hinge flange of the aileron attachment plate.

15 Claims, 2 Drawing Sheets

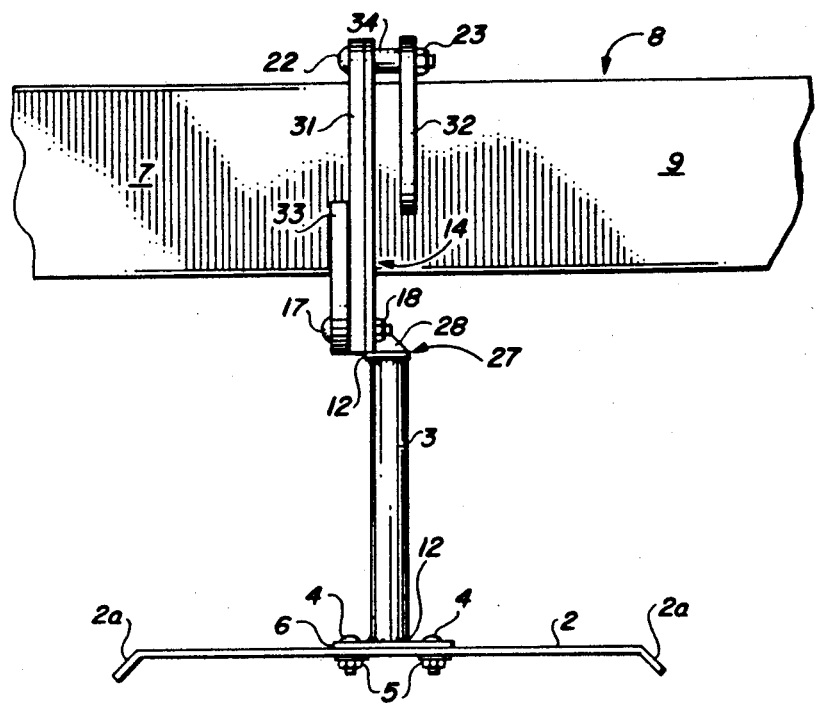
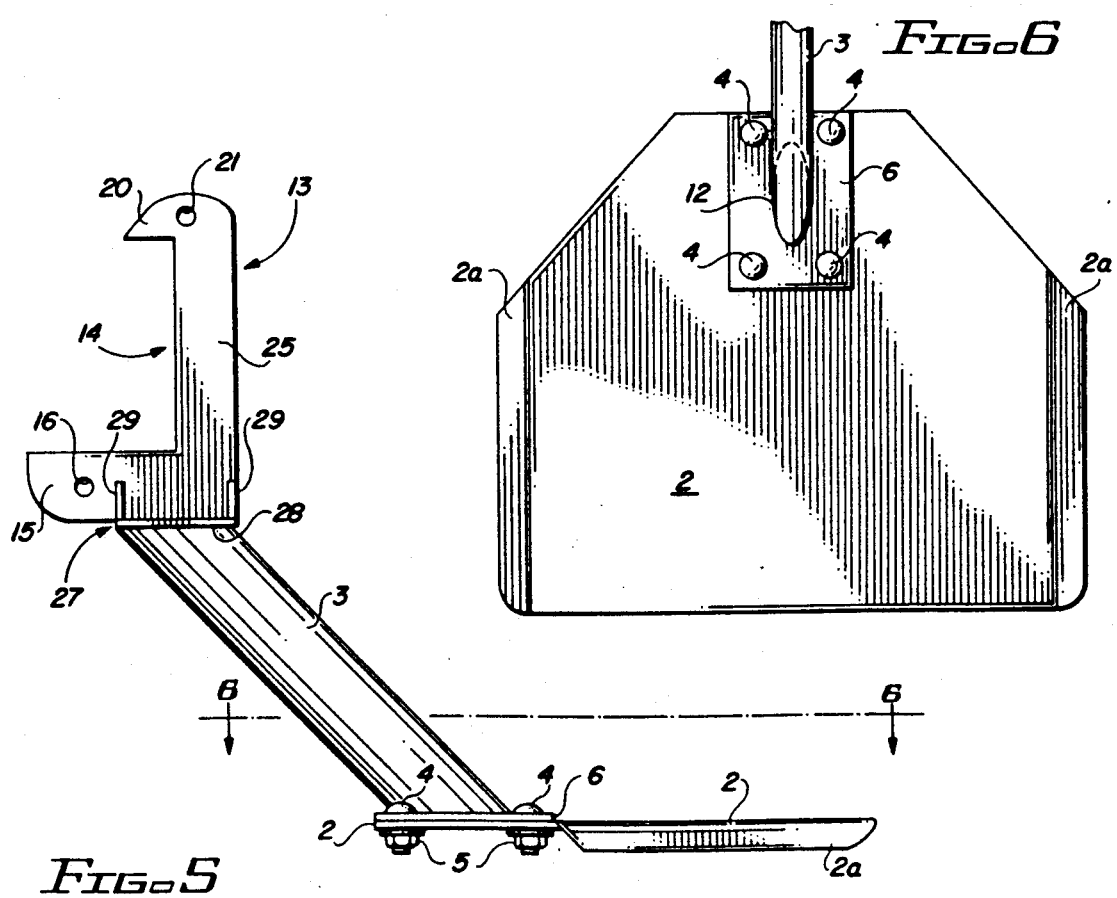

AILERON COUNTERBALANCE MOUNT BRACKET

BACKGROUND OF THE INVENTION

1. Field of the Invention

This invention relates to aileron counterbalances for aircraft and more particularly, to a counterbalance mount bracket for attaching an aileron counterbalance to each of the top wing ailerons of Grumman G-164 A, B and C aircraft. The counterbalance mount bracket is characterized by a generally C-shaped aileron attachment plate provided with a wing hinge flange at the lower end for attachment to the wing hinge extending downwardly from the top wing of the aircraft, an aileron hinge flange at the upper end for attachment to the aileron hinge projecting upwardly from the aileron of the aircraft and a connecting plate which connects the wing hinge flange to the aileron hinge flange. The connecting plate rests against a hinge connector that conventionally connects the wing hinge to the aileron hinge. A gusset plate is welded to the wing hinge flange for mounting the aileron counterbalance on the counterbalance mount bracket. The aileron attachment plate is designed to fit between the inside edge of the aileron and the corresponding edge of the top wing of the aircraft alongside the hinge connector and to pivot with the aileron responsive to operation of the aircraft controls by the pilot. The gusset plate is welded or otherwise secured to one end of the counterbalance tubing, the opposite end of the counterbalance tubing being fixedly attached to a spade mount plate which carries the counterbalance spade and locates the counterbalance spade beneath the top wing of the aircraft.

One of the problems realized in operating the Grumman G-164 A, B and C aircraft is the difficulty of executing sharp turns, especially at high speed, due to extensive air pressure on the ailerons. Such turns generally require extreme pressure on the joy stick, which makes execution of the turns difficult, uncomfortable and tiring for the pilot. In the course of crop dusting, a primary function of the Grummon G-164 A, B and C aircraft, many such turns must be executed in order to traverse and properly align the aircraft with rows of crops in a field or fields to be treated. Accordingly, the pilot is frequently physically exhausted after even a short flying time in such aircraft.

2. Description of the Prior Art

A useful development for application to aircraft of various design is the aileron counterbalance, which is characterized by a flat plate, or "spade", having downwardly extending flanges at opposite side edges thereof and a counterbalance tubing with one end attached to the spade and the opposite end secured to the aileron of the aircraft. The aileron counterbalance is designed such that the counterbalance spade is located parallel to the wing of the aircraft when the ailerons are aligned with the wing. However, when a turn is executed by the pilot and the aileron on one wing is raised, the spade moves downwardly, which movement facilitates air pressure against the top surface of the spade and assists the pilot in raising the aileron. Conversely, as the opposite aileron is lowered by the pilot, the angle of attack of the corresponding spade is raised, thus increasing air pressure on the bottom surface of the spade to aid the pilot in lowering the aileron. It has been found that the aileron counterbalance greatly relieves the pressure necessary for exertion on the joy stick or wheel by the pilot, with accompanying physical relief to the pilot in operating the aircraft, particularly in executing tight, fast turns. However, a problem is presented in mounting aileron counterbalances on some aircraft, typically the Grummon G-164 A, B and C aircraft, because of the unique design of the aileron hinges and wing hinges at the point where the ailerons are pivotally attached to the wing.

Accordingly, it is an object of this invention to provide a bracket for mounting aileron counterbalances on the ailerons of selected aircraft, which bracket is characterized by an aileron attachment plate, the top portion of which is attached to the aileron hinge of the aircraft and the bottom portion to the aircraft wing hinge, wherein one end of the counterbalance tubing is fixed to the bottom end of the aileron attachment plate and the opposite end of the counterbalance tubing receives the counterbalance spade.

Another object of the invention is to provide a bracket for mounting aileron counterbalances on the top wing ailerons of a Grummon aircraft, which bracket includes a generally C-shaped aileron attachment plate, the bottom flange of which is secured to the wing hinge of the aircraft and the top flange to the aileron hinge and further including a gusset plate welded to or shaped integrally with the bottom flange of the aileron attachment plate, wherein one end of the counterbalance tubing is welded or otherwise secured to the bottom flange of the aileron attachment plate and the opposite end of the counterbalance tubing mounts the counterbalance spade beneath the aircraft wing.

A still further object of this invention is to provide a counterbalance mount bracket for securing the free end of the counterbalance tubing of an aileron counterbalance to an aileron of a Grummon aircraft, which bracket is further characterized by an aileron attachment plate having a bottom flange adapted for attachment to the conventional wing hinge extending downwardly from the top wing of the aircraft, a top flange shaped to mount on the extending aileron hinge flange projecting upwardly from the aileron of the aircraft, a connecting plate connecting the bottom wing hinge flange to the top aileron hinge flange and a gusset plate welded to the bottom wing hinge flange for receiving and mounting the counterbalance tubing on the counterbalance mount bracket, such that the counterbalance spade is suspended beneath the wing for pivoting with the aileron.

Yet another object of this invention is to provide a bracket for attaching an aileron counterbalance to the aileron of a Grummon G-164 A, B and C aircraft, which bracket includes a generally C-shaped aileron attachment plate, a wing hinge flange of which is bolted to the wing hinge projecting downwardly from the wing of the aircraft, an aileron hinge flange of which is bolted to the aileron hinge projecting upwardly from the aircraft aileron and further including a connecting plate joining the wing hinge flange to the aileron hinge flange. The connecting plate lies against the hinge connector normally connecting the wing hinge to the aileron hinge and a gusset plate is welded or otherwise secured to the wing hinge flange for receiving one end of the counterbalance tubing, the opposite end of the counterbalance tubing being attached to the counterbalance spade, such that the counterbalance spade is mounted on the aileron and located beneath the aircraft wing.

SUMMARY OF THE INVENTION

These and other objects of the invention are provided in a new and improved aileron counterbalance mount bracket for mounting a pair of aileron counterbalances beneath the top wing of a Grummon G-164, A, B and C aircraft, wherein each aileron counterbalance mount bracket includes a generally C-shaped aileron attachment plate provided with a wing hinge flange adapted for bolting to the wing hinge extending from the top wing of the aircraft, an aileron hinge flange adapted for bolting to the aileron hinge projecting from the corresponding aileron of the aircraft and a connecting plate connecting the wing hinge flange to the aileron hinge flange. The connecting plate lies alongside the conventional hinge connector pivotally bolted to the wing hinge and aileron hinge and further includes a gusset plate welded to or shaped integrally with the wing hinge flange for receiving one end of the counterbalance tubing, the opposite end of the counterbalance tubing carrying the counterbalance spade for fixedly mounting the counterbalance spade on the aileron.

BRIEF DESCRIPTION OF THE DRAWINGS

The invention will be better understood by reference to the accompanying drawings, wherein:

FIG. 4 is a sectional view taken along line 4—4 of the aileron counterbalance mount bracket and aileron counterbalance illustrated in FIG. 2;

FIG. 5 is a side view of the aileron counterbalance mount bracket and aileron counterbalance illustrated in FIGS. 1-4; and FIG. 6 is a sectional view taken along line 6—6 of the aileron counterbalance spade illustrated in FIG. 5, mounted by the counterbalance mount bracket of this invention.

DESCRIPTION OF THE PREFERRED EMBODIMENTS

Figure 1:
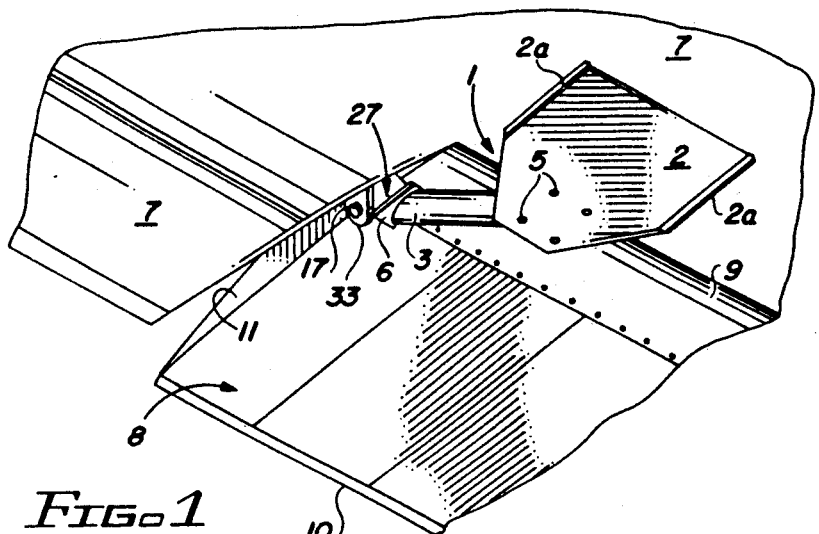
FIG. 1 is a perspective view, partially in section, of the bottom side of the left wing and left aileron of an aircraft, illustrating a preferred embodiment of the aileron counterbalance mount bracket of this invention mounting an aileron counterbalance.
Figure 2:
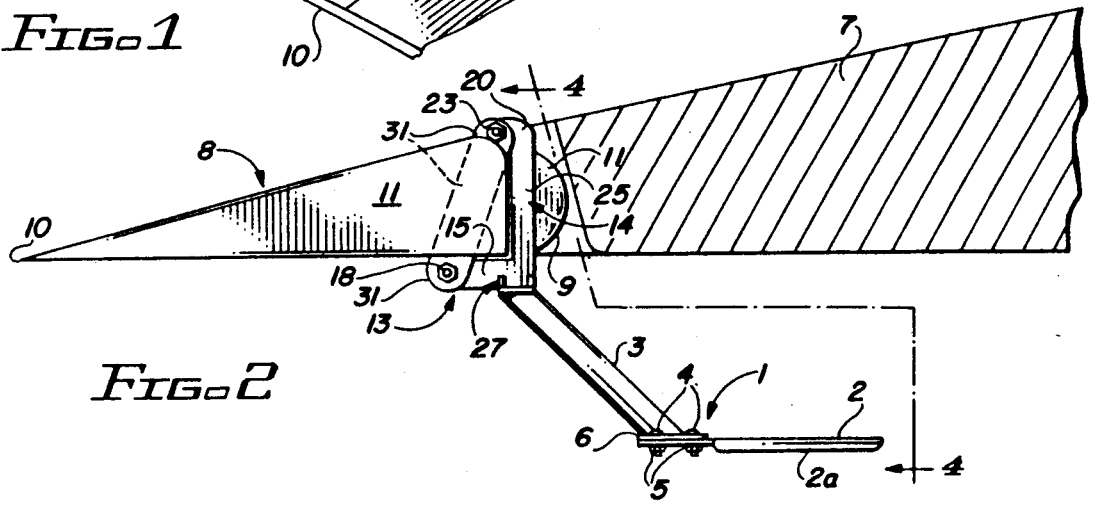
FIG. 2 is an inboard side sectional view of the aileron counterbalance mount bracket and aileron counterbalance illustrated in FIG. 1.
Figure 3:
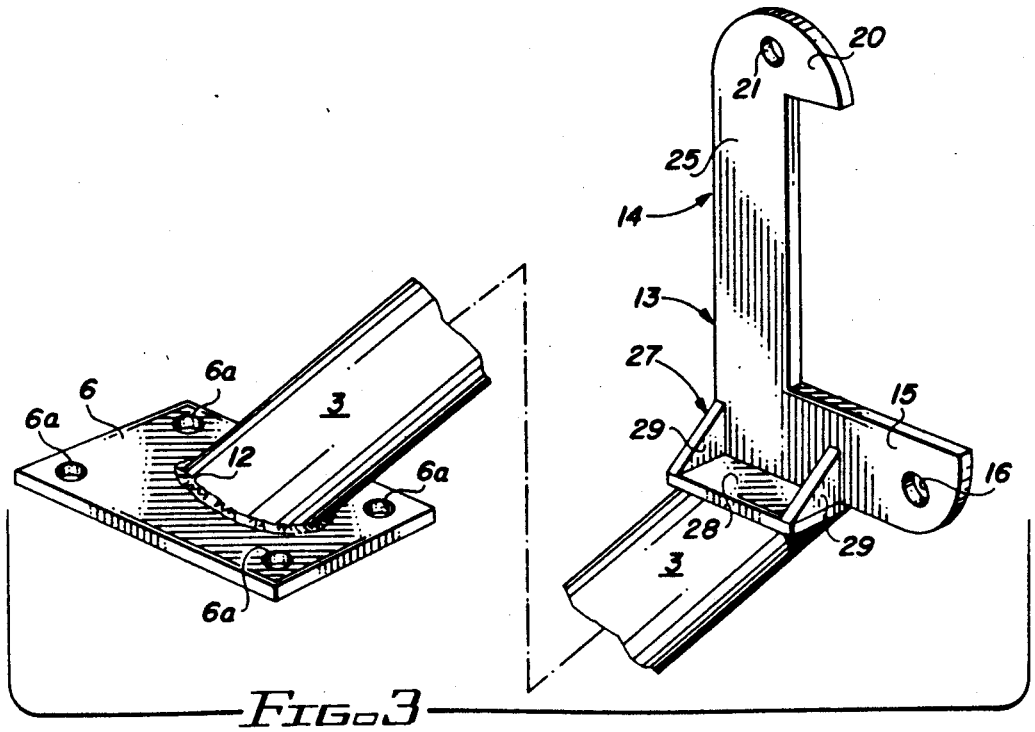
FIG. 3 is an exploded view of the aileron counterbalance mount bracket and counterbalance tubing illustrated in FIGS. 1 and 2.

Referring initially to FIGS. 1-3 of the drawings, a conventional aileron counterbalance is generally illustrated by reference numeral 1 and includes a flat counterbalance spade 2, having downwardly-extending spade flanges 2a at opposite edges thereof. One end of an oval, aerodynamic counterbalance tubing 3 is welded to a flat spade mount plate 6 by means of a weld 12 at one end thereof and the spade mount plate 6 is secured to the counterbalance spade 2 by means of spade bolts 4, which extend through corresponding mount plate apertures 6a, provided in the spade mount plate 6 and are secured by the spade nuts 5, as illustrated in FIGS. 2 and 3. The aileron counterbalance 1 is illustrated in functional configuration suspended beneath the top left wing 7 and forward of the top left aileron 8, which is conventionally hinged to the top left wing 7, as illustrated in FIGS. 1 and 2. The top left aileron 8 is characterized by a rounded aileron leading edge 9, which tapers to a narrow aileron trailing edge 10 and the top left aileron 8 terminates at an inboard aileron inside surface 11, as illustrated in FIG. 2. As further illustrated in FIGS. 2 and 3, the opposite end of the counterbalance tubing 3 is welded to the gusset plate 27 and triangular gussets 29 extend upwardly from welded attachment to the flat gusset plate base 28, as illustrated. Furthermore, the wing hinge flange 15 of the generally C-shaped aileron attachment plate 14 is welded both to the gussets 29 and the gusset plate base 28. An aileron hinge flange 20 terminates the top end of the connecting plate 25 and an aileron hinge bolt aperture 21 is provided in the aileron hinge flange 20, while a wing hinge bolt aperture 16 is located in the extending end of the wing hinge flange 15. It is understood that while the counterbalance tubing 3 may be welded directly to the wing hinge flange 15, in a most preferred embodiment of the invention, the wing hinge flange 15 is welded to the gusset plate 27, as described above, and the gusset plate 27 and the aileron attachment plate 14 together define a preferred embodiment of the aileron counterbalance mount bracket 13 (hereinafter called counterbalance mount bracket 13), of this invention.

Referring now to FIGS. 2-4 of the drawings, by way of example the counterbalance mount bracket 13 is secured to the top left aileron 8, which is, in turn, hinged to the top left wing 7 of the aircraft, as follows: a wing hinge 33 projects downwardly from the top left wing 7 and an aileron hinge 32 extends upwardly from the top left aileron 8, as illustrated in FIG. 4. Furthermore, a hinge connector 31 connects the wing hinge 33 and the aileron hinge 32 by means of a wing hinge bolt 17 and a companion wing hinge nut 18 and an aileron hinge bolt 22 and cooperating aileron hinge nut 23, respectively, in conventional fashion. A spacer 34 is normally located between the aileron hinge 32 and the hinge connector 31, as further illustrated in FIG. 4. The aileron attachment plate 14 element of the counterbalance mount bracket 13 is installed alongside the hinge connector 31, such that the aileron hinge bolt 22 projects through the aileron bolt aperture 21, located in the aileron hinge flange 20, while the wing hinge bolt 17 extends through the corresponding wing hinge bolt aperture 16, located in the wing hinge flange 15, to secure the aileron hinge flange 20 to the aileron hinge 32 by means of the aileron hinge nut 23, and the wing hinge flange 15 to the wing hinge 33 by means of the wing hinge nut 18, as further illustrated in FIGS. 3 and 4.

Referring now to FIGS. 1, 2 and 4 of the drawings, for purposes of illustration, it will be appreciated that in operation, the counterbalance spade 2 is normally located beneath the top left wing 7 and forward of the top left aileron 8, essentially parallel to the bottom surface of the top left wing 7 and the top left aileron 8, as illustrated in FIG. 2, when the aircraft is flying straight and level. When the pilot manipulates the controls to pivot the top left aileron 8 upwardly about the wing hinge bolt 17, this action lowers the counterbalance spade 2 and presents the top surface of the counterbalance spade 2 to the air flowing past the aircraft. The force of the air against the top surface of the counterbalance spade 2 aids in pivoting the top left aileron 8 upwardly and releases pressure on the controls, thus allowing the pilot to make the necessary turn with less pressure on the joy stick or wheel. Similarly, if the pilot manipulates the controls to pivot the top left aileron downwardly about the wing hinge bolt 17, the angle of attack of the counterbalance spade 2 is raised, thereby presenting the bottom surface of the counterbalance spade 2 to the air stream and exerting air pressure on this bottom surface. This pressure aids in further pivoting of the top left aileron 8 upwardly about the wing hinge bolt 17 and also eases the pressure on the controls.

Referring again to the drawings, while the aileron counterbalance 1 is illustrated by way of example mounted only on the top left aileron 8 of an aircraft, it will be appreciated by those skilled in the art that the counterbalance mount bracket 13 of this invention is designed to secure an aileron counterbalance 1 on one or more wings of any aircraft having the aileron and wing mount configuration illustrated in the drawings. Typically, the counterbalance mount bracket 13 is designed to mount a pair of aileron counterbalances on the top ailerons of Grummon G-164 A, B and C aircraft, in order to reduce the amount of pressure which the pilot must apply to the joy stick in order to easily execute turns, particularly at high speeds. It will be further appreciated by those skilled in the art that the aileron attachment plate 14 and gusset plate 27 elements of the counterbalance mount bracket 13 can be constructed of any FFA approved material, according to the knowledge of those skilled in the art. Furthermore, it will be understood that the counterbalance mount bracket 13 is quickly and easily attached to the existing wing hinge flange 15 and aileron hinge flange 20 of the aircraft and can be easily removed therefrom, as desired. Moreover, disassembly of the counterbalance spade 2 from the counterbalance tubing 3 is facilitated by removing the spade bolts 4 and cooperating spade nuts 5 to mount a counterbalance spade 2 of selected design and size.

Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A counterbalance mount bracket for mounting on the wing hinge, the aileron hinge and the hinge connector connecting the wing hinge and the aileron hinge of an aircraft and securing an aileron counterbalance to an aircraft aileron, said counterbalance mount bracket comprising aileron attachment plate means having one end adapted for attachment to said aileron hinge and the hinge connector and the opposite end of said aileron attachment plate means adapted for attachment to said wing hinge, the hinge connector and the aileron counterbalance, whereby operating of said aileron causes a corresponding movement of the aileron counterbalance.

2. The counterbalance mount bracket of claim 1 further comprising gusset plate means provided on said wing hinge flange for receiving the aileron counterbalance and securing the aileron counterbalance to said wing hinge flange.

3. The counterbalance mount bracket of claim 1 wherein the wing hinge is connected to one end of the hinge connector by a wing hinge bolt and a wing hinge nut and the aileron hinge is connected to the opposite end of the hinge connector by an aileron hinge bolt and an aileron hinge nut and further comprising an aileron bolt aperture provided in said aileron hinge flange for receiving the aileron hinge bolt and a wing hinge bolt aperture provided in said wing hinge flange for receiving the wing hinge bolt and mounting said aileron attachment plate on the aileron hinge and the wing hinge, with said connecting plate lying against the hinge connector.

4. The counterbalance mount bracket of claim 3 further comprising gusset plate means provided on said opposite end of said connecting plate for receiving the aileron counterbalance and securing the aileron counterbalance to said opposite end of said wing hinge flange.

5. The counterbalance mount bracket of claim 4 wherein said gusset plate means further comprises a gusset plate base provided on said wing hinge flange and at least one gusset upward-standing from said gusset plate base, said gusset attached to said wing hinge flange.

6. A counterbalance mount bracket for supporting the counterbalance tubing of an aileron counterbalance and mounting on the aileron hinge, wing hinge and hinge connector of a Grummon aircraft, said counterbalance mount bracket further comprising an aileron attachment plate having a connecting plate positioned against the hinge connector, an aileron hinge flange provided on one end of said connecting plate for attachment to the aileron hinge, a wing hinge flange provided on the opposite end of said connecting plate for attachment to the wing hinge and a gusset plate provided on said opposite end of said connecting plate for mounting the counterbalance tubing and connecting the aileron counterbalance to the aileron, whereby the aileron counterbalance moves with the aileron responsive to operation of the aileron by the pilot of the aircraft.

7. The counterbalance mount bracket of claim 6 wherein the wing hinge is connected to one end of the hinge connector by a wing hinge bolt and a wing hinge nut and the aileron hinge is connected to the opposite end of the hinge connector by an aileron hinge bolt and an aileron hinge nut and further comprising an aileron bolt aperture provided in said aileron hinge flange for receiving the aileron hinge bolt and a wing hinge bolt aperture provided in said wing hinge flange for receiving the wing hinge bolt and mounting said counterbalance mount bracket on the aileron hinge and the wing hinge.

8. The counterbalance mount bracket of claim 6 wherein said gusset plate further comprises a gusset plate base welded to said wing hinge flange and at least one gusset upward-standing from said gusset plate base, said gusset welded to said wing hinge flange.

9. The counterbalance mount bracket of claim 7 wherein:
(a) the wing hinge is connected to one end of the hinge connector by a wing hinge bolt and a wing hinge nut and the aileron hinge is connected to the opposite end of the hinge connector by an aileron hinge bolt and an aileron hinge nut and further comprising an aileron bolt aperture provided in said aileron hinge flange for receiving the aileron hinge bolt and a wing hinge bolt aperture provided in said wing hinge flange for receiving the wing hinge bolt and mounting said counterbalance mount bracket on the aileron hinge and the wing hinge; and
(b) said gusset plate further comprises a gusset plate base welded to said wing hinge flange and at least one gusset upward-standing from said gusset plate base, said gusset welded to said wing hinge flange.

10. A counterbalance mount bracket for mounting on the wing hinge and aileron hinge of an aircraft and securing an aileron counterbalance to the aileron, with a hinge connector connecting the wing hinge and aileron hinge, said counterbalance mount bracket comprising an aileron attachment plate characterized by a connecting plate fitted against the hinge connector, a wing hinge flange provided at the bottom end of said connecting plate for attachment to the wing hinge and the aileron counterbalance and an aileron hinge flange provided at the top end of said connecting plate for attachment to the aileron hinge, whereby the aileron counterbalance moves with said counterbalance mount bracket and the aileron responsive to operation of the aircraft.

11. The counterbalance mount bracket of claim 10 further comprising gusset plate means provided on said opposite end of said connecting plate for receiving the aileron counterbalance and securing the aileron counterbalance to said opposite end of said connecting plate.

12. The counterbalance mount bracket of claim 11 wherein said gusset plate means further comprises a gusset plate base welded to said wing hinge flange and at least one gusset upward-standing from said gusset plate base, said gusset welded to said wing hinge flange.

13. The counterbalance mount bracket of claim 10 wherein the wing hinge is connected to one end of the hinge connector by a wing hinge bolt and a corresponding wing hinge nut and the aileron hinge is connected to the opposite end of the hinge connector by an aileron hinge bolt and a corresponding aileron hinge nut and further comprising an aileron bolt aperture provided in said aileron hinge flange for receiving the aileron hinge bolt and a wing hinge bolt aperture provided in said wing hinge flange for receiving the wing hinge bolt and mounting said aileron attachment plate on the aileron hinge and the wing hinge, with said connecting plate lying against the hinge connector.

14. The counterbalance mount bracket of claim 13 further comprising gusset plate means provided on said opposite end of said connecting plate for receiving the aileron counterbalance and securing the aileron counterbalance to said opposite end of said aileron connecting plate.

15. The counterbalance mount bracket of claim 14 wherein said gusset plate means further comprises a gusset plate base welded to said wing hinge flange and at least one gusset upward-standing from said gusset plate base, said gusset welded to said wing hinge flange.

* * * * *